United States Patent
Cha et al.

(10) Patent No.: US 11,292,384 B2
(45) Date of Patent: Apr. 5, 2022

(54) PATTERN SKIN LIGHTING DEVICE OF VEHICLE

(71) Applicants: Hyundai Motor Company, Seoul (KR); Kia Motors Corporation, Seoul (KR)

(72) Inventors: Dong Eun Cha, Hwaseong-Si (KR); Jin Ho Hwang, Cheonan-Si (KR); Sang Heon Lee, Seoul (KR); Julliana Cho, Seoul (KR); Jin Seok Seo, Seoul (KR); Byoung Oh Choi, Yongin-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 61 days.

(21) Appl. No.: 16/882,218

(22) Filed: May 22, 2020

(65) Prior Publication Data
US 2021/0129744 A1    May 6, 2021

(30) Foreign Application Priority Data
Nov. 4, 2019    (KR) .......................... 10-2019-0139722

(51) Int. Cl.
*B60Q 1/26* (2006.01)
*F21V 14/04* (2006.01)
(Continued)

(52) U.S. Cl.
CPC .......... *B60Q 1/2619* (2013.01); *F21V 7/0016* (2013.01); *F21V 7/0033* (2013.01);
(Continued)

(58) Field of Classification Search
CPC .. B60Q 1/2619; B60Q 1/2696; B60Q 1/2615; F21V 14/04; F21V 7/0033; F21V 7/0016;
(Continued)

(56) References Cited

U.S. PATENT DOCUMENTS

| 6,543,910 B2 * | 4/2003 | Taniuchi | ............... F21S 41/689 362/297 |
| 2006/0062011 A1 * | 3/2006 | Yamamura | .............. F21S 41/36 362/517 |

(Continued)

FOREIGN PATENT DOCUMENTS

| EP | 1985913 A1 | 10/2008 |
| JP | 2008-27650 A | 2/2008 |

(Continued)

*Primary Examiner* — Fatima N Farokhrooz
(74) *Attorney, Agent, or Firm* — Morgan, Lewis & Bockius LLP (57) ABSTRACT

A pattern skin lighting device of a vehicle may include a plurality of lightning cells disposed on a plane while forming a predetermined pattern. Each lightning cell includes a light emitting element, a cell pocket configured to surround the light emitting element, a cell cover configured to be pivotable with respect to the cell pocket while surrounding the light emitting element within the cell pocket, and an actuator engaged to an end of the cell cover and configured to selectively pivot the cell cover with respect to the cell pocket.

8 Claims, 7 Drawing Sheets

(51) Int. Cl.
*F21V 7/00* (2006.01)
*F21W 104/00* (2018.01)
*F21Y 115/10* (2016.01)

(52) U.S. Cl.
CPC ......... *F21V 14/04* (2013.01); *F21W 2104/00* (2018.01); *F21Y 2115/10* (2016.08)

(58) Field of Classification Search
CPC .......... F21V 17/105; F21V 15/01; F21V 7/04; F21V 23/04; F21W 2104/00; F21W 2102/13; F21Y 2115/10; F21S 43/14; F21S 43/15; F21S 43/31; F21S 43/37; F21S 41/30; F21S 41/50; F21S 41/683; F21S 41/635

See application file for complete search history.

(56) References Cited

U.S. PATENT DOCUMENTS

| | | | | |
|---|---|---|---|---|
| 2015/0009699 A1* | 1/2015 | Takii | ........................ | B60Q 1/10 |
| | | | | 362/523 |
| 2015/0137680 A1* | 5/2015 | Komatsu | .............. | B60Q 11/005 |
| | | | | 315/82 |
| 2017/0158112 A1* | 6/2017 | Mouri | ................... | F21S 41/125 |

FOREIGN PATENT DOCUMENTS

| KR | 10-1375772 | 3/2014 |
|---|---|---|
| KR | 10-2015-0145294 A | 12/2015 |

\* cited by examiner

PATTERN SKIN LIGHTING DEVICE OF VEHICLE

CROSS-REFERENCE TO RELATED APPLICATION

The present application claims priority to Korean Patent Application No. 10-2019-0139722, filed on Nov. 4, 2019, in the Korean Intellectual Property Office, the entire contents of which is incorporated herein for all purposes by this reference.

BACKGROUND OF THE INVENTION

Field of the Invention

The present invention relates to lighting technology for vehicles.

Description of Related Art

Among recently-developed lamps for vehicles, there are lamps configured for presentation of a lighting image distinguished from those of conventional cases through arrangement of a plurality of light sources such as light emitting diodes (LEDs) on a single light emitting surface.

Such lighting devices have a fixed lighting output configuration in which light sources such as LEDs as mentioned above are simply turned on or off.

In a future autonomous vehicle age, the space where the user lives and the space of the vehicle driven by the user will be variably and positively connected and controllable. To this end, various functions of the vehicle and various connection methods are demanded.

When various lamp devices mounted to a vehicle to generate light can realize more various lighting output forms, these lamp devices may help to accomplish the above-mentioned demand.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a pattern skin lighting device of a vehicle, which is mounted to a vehicle body of the vehicle to positively realize more various lighting output forms, being configured for achieving presentation of a lighting pattern image having an elegant design at the vehicle.

In accordance with an aspect of the present invention, the above and other objects may be accomplished by the provision of a pattern skin lighting device of a vehicle including lightning cells having the following configuration, the lightning cells being disposed on a plane while forming a predetermined pattern.

Each of the lightning cells may include a light emitting element, a cell pocket configured to surround the light emitting element, a cell cover configured to be pivotable with respect to the cell pocket while surrounding the light emitting element within the cell pocket, and an actuator engaged to an end of the cell cover and configured to selectively pivot the cell cover with respect to the cell pocket.

The cell cover may be configured to be pivotable with respect to the cell pocket within a predetermined limited range.

A cell link may be connected to an interior of the cell cover such that the cell cover is pivotable relative to the cell link. The cell link may be disposed in the cell pocket to be slidable in a direction toward the cell cover within a predetermined range.

The cell cover may be disposed to allow light from the light emitting element to pass only through a gap formed between one end portion of the cell cover and the cell pocket.

A first mirror may be provided at the cell pocket to reflect light advancing to the gap between the cell cover and the cell pocket, facilitating the reflected light to be emitted to an outside of the lightning cell.

A second mirror may be provided at the cell cover to again reflect light reflected by the first mirror, facilitating the re-reflected light to be emitted to the outside of the lightning cell.

An external surface of the cell cover may be formed to have a shape in which at least two planes meet to form a predetermined angle.

The external surface of the cell cover may be formed to have a shape in which two planes meet at a position adjacent to a pivot of the cell cover to form a predetermined angle. The second mirror may be provided at a surface of the plane adjacent to the gap between the second mirror and the cell pocket, among the two planes outside the cell cover.

The actuator may include an electromagnet disposed to vary magnetic force acting between the cell cover and the cell pocket.

In accordance with various aspects of the present invention, it may be possible to positively realize more various lighting output forms at a vehicle, achieving presentation of a lighting pattern image having an elegant design at the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to the exemplary embodiments of the present invention, examples of which are illustrated in the accompanying drawings. Wherever possible, the same reference numbers will be used throughout the drawings to refer to the same or like parts.

Referring to FIG. 1, FIG. 2, FIG. 3, and FIG. 4, a pattern skin lighting device 100 of a vehicle according to an exemplary embodiment of the present invention is illustrated. The pattern skin lighting device 100 includes lightning cells 1 disposed on a plane while forming a predetermined pattern. The configuration of the lightning cells 1 will be described later.

Each lightning cell 1 includes a light emitting element 3, a cell pocket 5 configured to surround the light emitting element 3, and a cell cover 7 configured to be pivotable with respect to the cell pocket 5 while surrounding the light emitting element 3 within the cell pocket 5. Each lightning cell 1 further includes an actuator 9 configured to selectively pivot the cell cover 7 with respect to the cell pocket 5.

That is, each of the lightning cells 1 forming the pattern skin lighting device 100 according to the exemplary embodiment of the present invention is configured not only to vary light generated from the light emitting element 3 internally disposed within the cell pocket 5 in accordance with adjustment of the light emitting element 3 itself, but also to vary an externally-expressed lighting state in accordance with a pivoting state of the cell cover 7. Furthermore, light emission states of the lightning cells 1 are controlled in an individual manner. Accordingly, it may be possible not only to realize a lighting state forming a so-called star cloud image, but also to selectively vary the lighting state such that a lighting pattern image having an elegant design is formed on the exterior of the vehicle.

For reference, the star cloud image means an image in which bright and dark areas appear locally in a mixed state, like a photograph of a nebula.

The light emitting element 3 may have a light emitting diode (LED) or the like.

The cell cover 7 is configured to be pivotable with respect to the cell pocket 5 within a predetermined limited range.

A cell link 11 is connected to inside of the cell cover 7 such that the cell link 11 and the cell cover 7 are pivotable relative to each other. The cell link 11 is disposed in the cell pocket 5 to be slidable in a direction toward the cell cover 7 within a predetermined range.

Accordingly, the cell link 11 may provide a function for smoothly pivoting the cell cover 7 with respect to the cell pocket 5, adjusting a position of the cell cover 7 with respect to the cell pocket 5.

To this end, the predetermined range in which the cell link 11 is slidable within the cell pocket 5 be set to a range required for adjustment of a relative position of the cell cover 7 to the cell pocket 5 in each lightning cell for security of smooth pivoting of the cell cover 7 as described above.

Figure 2:
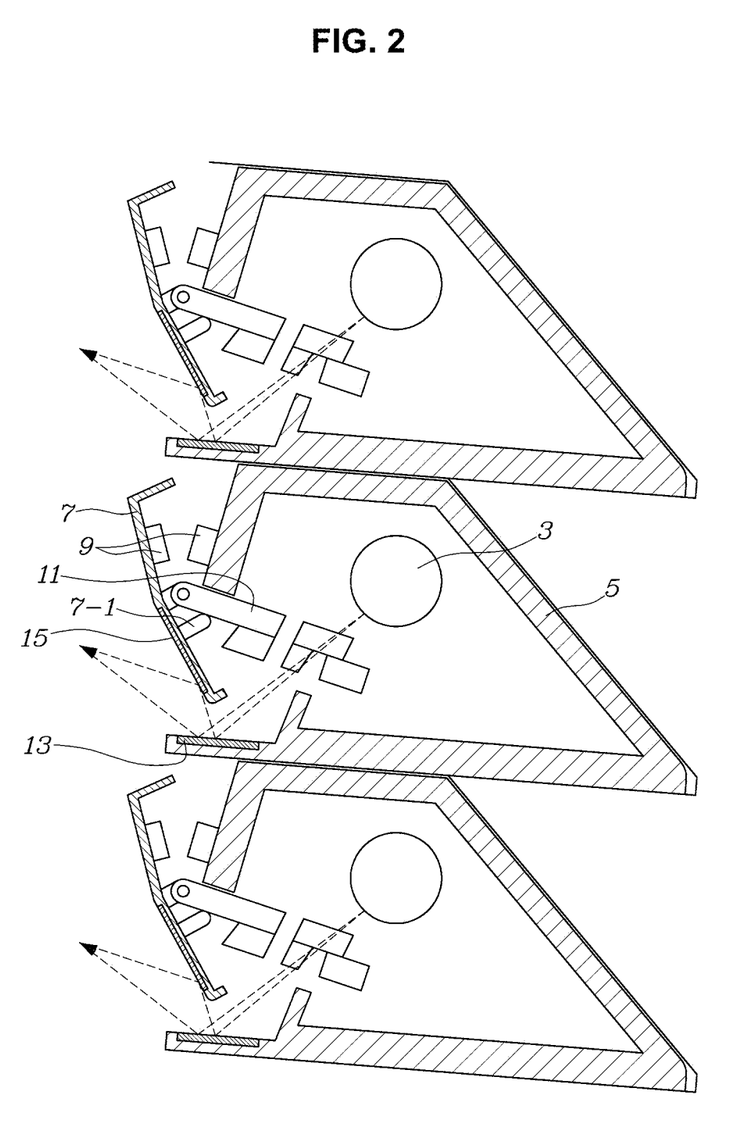
FIG. 2 is a view explaining a cross-sectional structure of lightning cells forming the pattern skin lighting device of FIG. 1.
Figure 3:
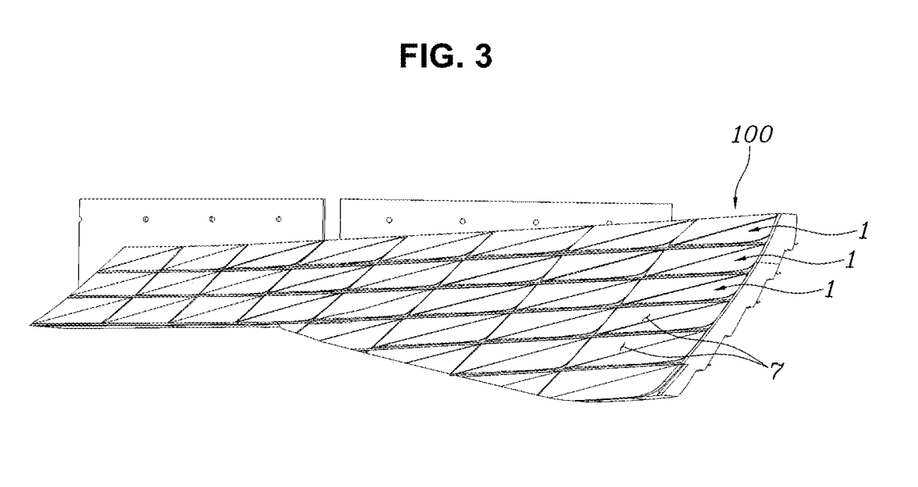
FIG. 3 is a view showing a state in which a cell cover of each lightning cell pivots through an angle different from that of FIG. 1.
Figure 4:
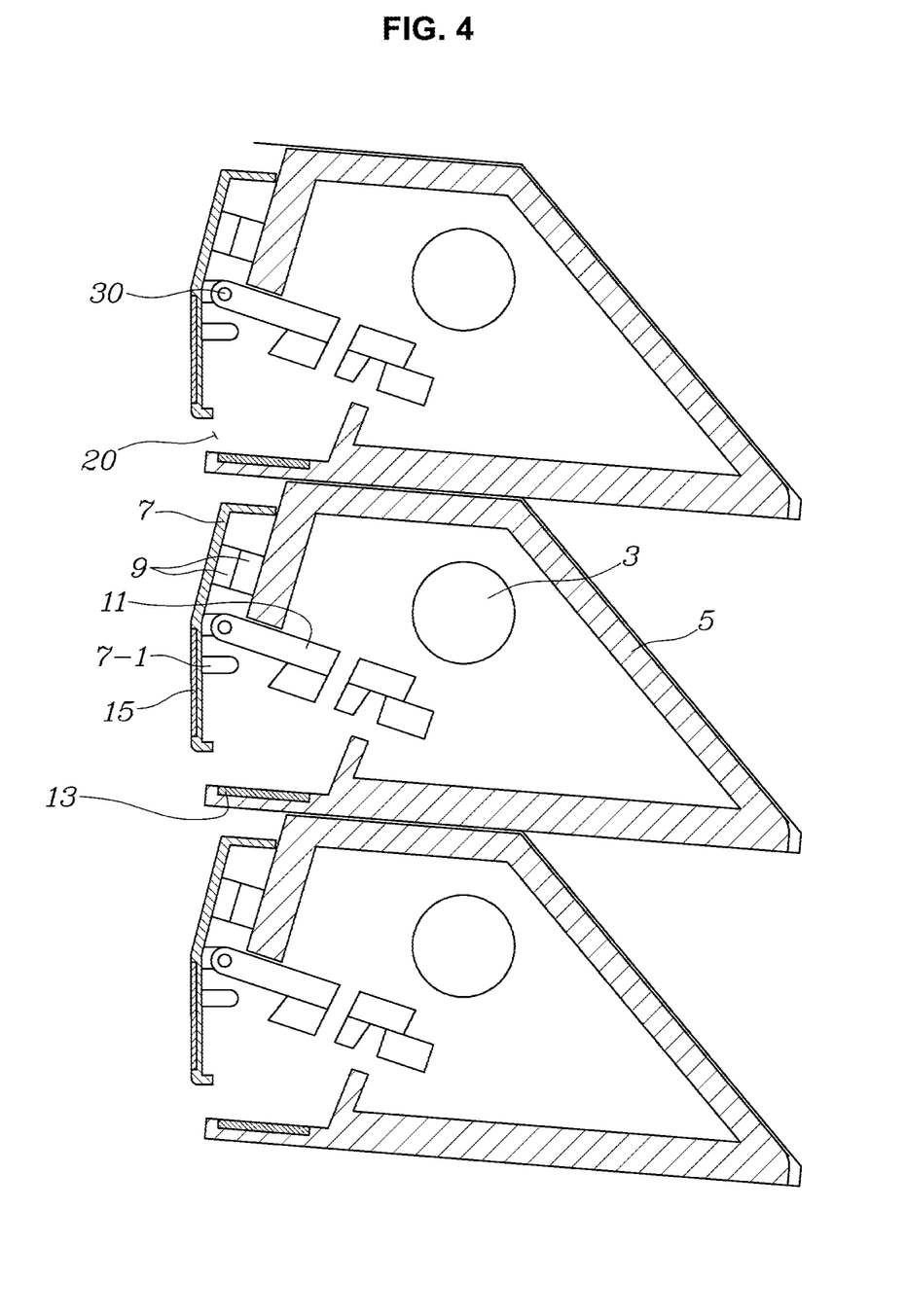
FIG. 4 is a view explaining a cross-sectional structure of each lightning cell in the state of FIG. 3.
Figure 5:
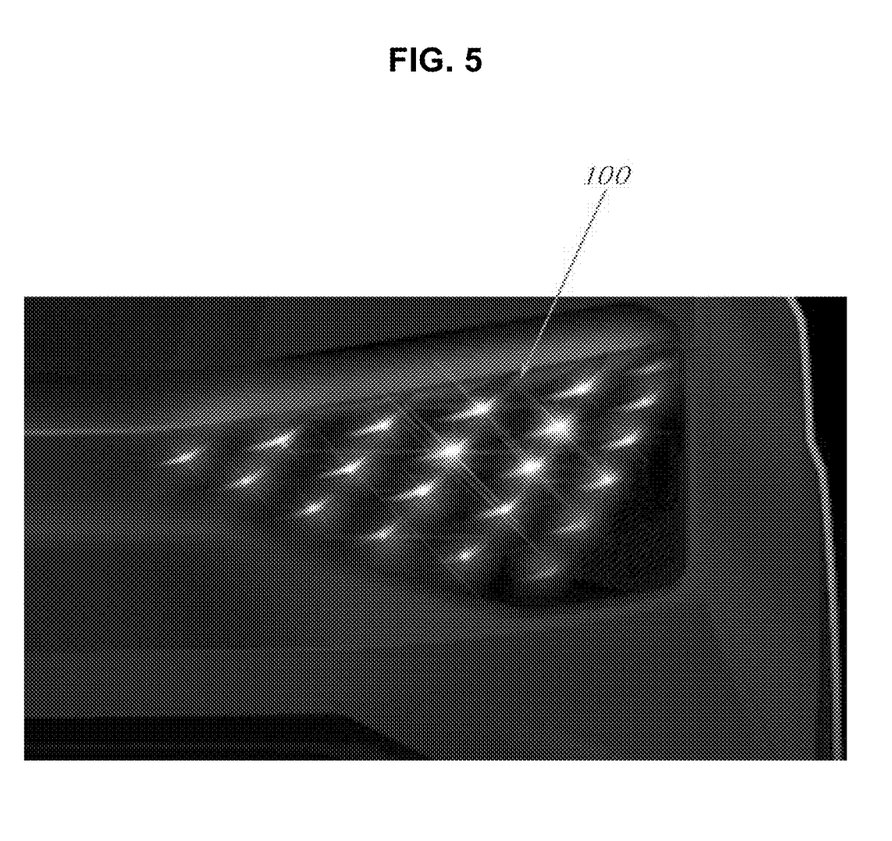
FIG. 5 is a view exemplarily illustrating a state in which the pattern skin lighting device according to the exemplary embodiment of the present invention is disposed at a front portion of the vehicle.
Figure 6:
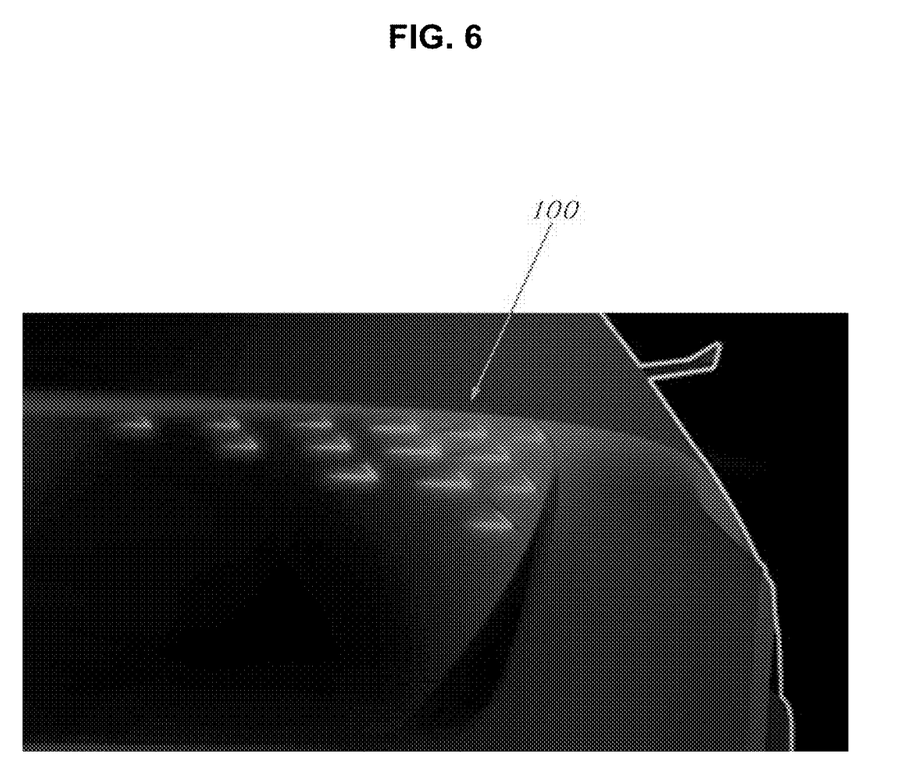
FIG. 6 is a view exemplarily illustrating a state in which the pattern skin lighting device according to the exemplary embodiment of the present invention is disposed at a rear portion of the vehicle.

For reference, in the case of FIG. 2, a stop protrusion or the like may be provided at an end portion of the cell link 11 toward the cell pocket 5 to realize a function for limiting a range in which the cell link 11 is slidable with respect to the cell pocket 5.

The cell cover 7 is pivotable about a portion thereof relatively pivotably connected to the cell link 11 as a pivot. The predetermined range in which the cell cover 7 is pivotable with respect to the cell pocket 5 is set by an angle limiting protrusion 7-1 protruding from the interior of the cell cover 7 toward the cell link 11.

As illustrated in FIG. 2, the cell cover 7 is disposed to allow light from the light emitting element to pass only through a gap 20 formed between one end portion of the cell cover 7 and the cell pocket 5.

That is, as shown in FIG. 2, light generated from the light emitting element 3 may be externally emitted only through the gap formed between the cell pocket 5 and the cell cover 7, as described above, while being prevented from being directly externally emitted by the cell pocket 5 surrounding the light emitting element 3 and the cell cover 7.

A first mirror 13 is provided at the cell pocket 5 to reflect light advancing to the gap between the cell cover 7 and the cell pocket 5, facilitating the reflected light to be emitted to the outside of the lightning cell 1.

Furthermore, a second mirror 15 is provided at the cell cover 7 to again reflect light reflected by the first mirror 13, facilitating the re-reflected light to be emitted to the outside of the lightning cell 1.

An external surface of the cell cover 7 may be formed to have a shape in which at least two planes meet to form a predetermined angle.

In an exemplary embodiment of the present invention, the external surface of the cell cover 7 is formed to have a shape in which two planes meet at a position adjacent to the pivot 30 of the cell cover 7 to form a predetermined angle, as shown in FIG. 2. In the instant case, the second mirror 15 is provided at a surface of the plane adjacent to the gap between the second mirror 15 and the cell pocket 5, among the two planes outside the cell cover 7.

Accordingly, not only may a lighting image presented at the outside of the lightning cell 1 be varied through brightness adjustment of the light emitting element 3 internally disposed within the lightning cell 1 itself, but also the amount and angle of light reflected by each of the first mirror 13 and the second mirror 15 may be varied. Accordingly, various lighting states, which are continuously variable, may be realized. Furthermore, a gradation lighting effect may be provided at the outside of the cell cover 7.

Figure 1:
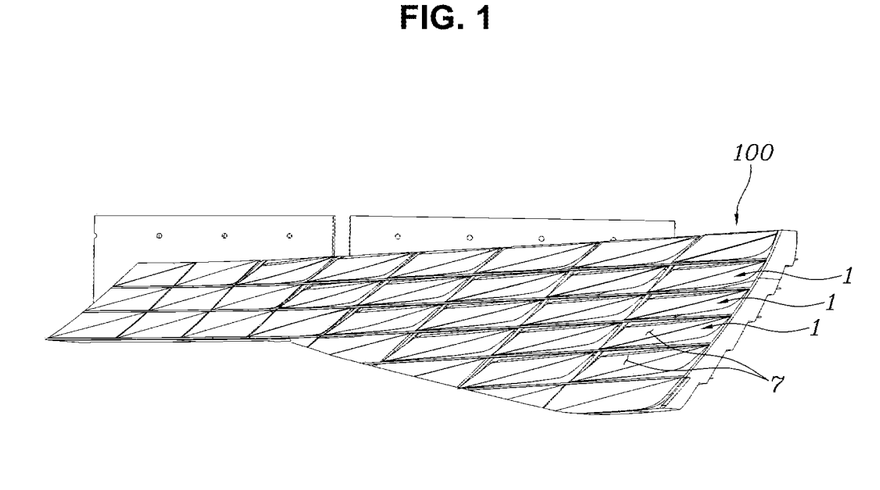
FIG. 1 is a view exemplarily illustrating a pattern skin lighting device of a vehicle according to an exemplary embodiment of the present invention.

For reference, in FIG. 1, the appearance of the cell cover 7 is formed to have a diamond shape. In the instant case, the cell cover 7 is configured to be pivotable about the longest one of diagonal lines of the diamond shape.

Of course, the cell cover 7 may be configured to be pivotable about other positions in accordance with lighting effects to be realized and relations thereof with elements adjacent thereto.

Figure 7:
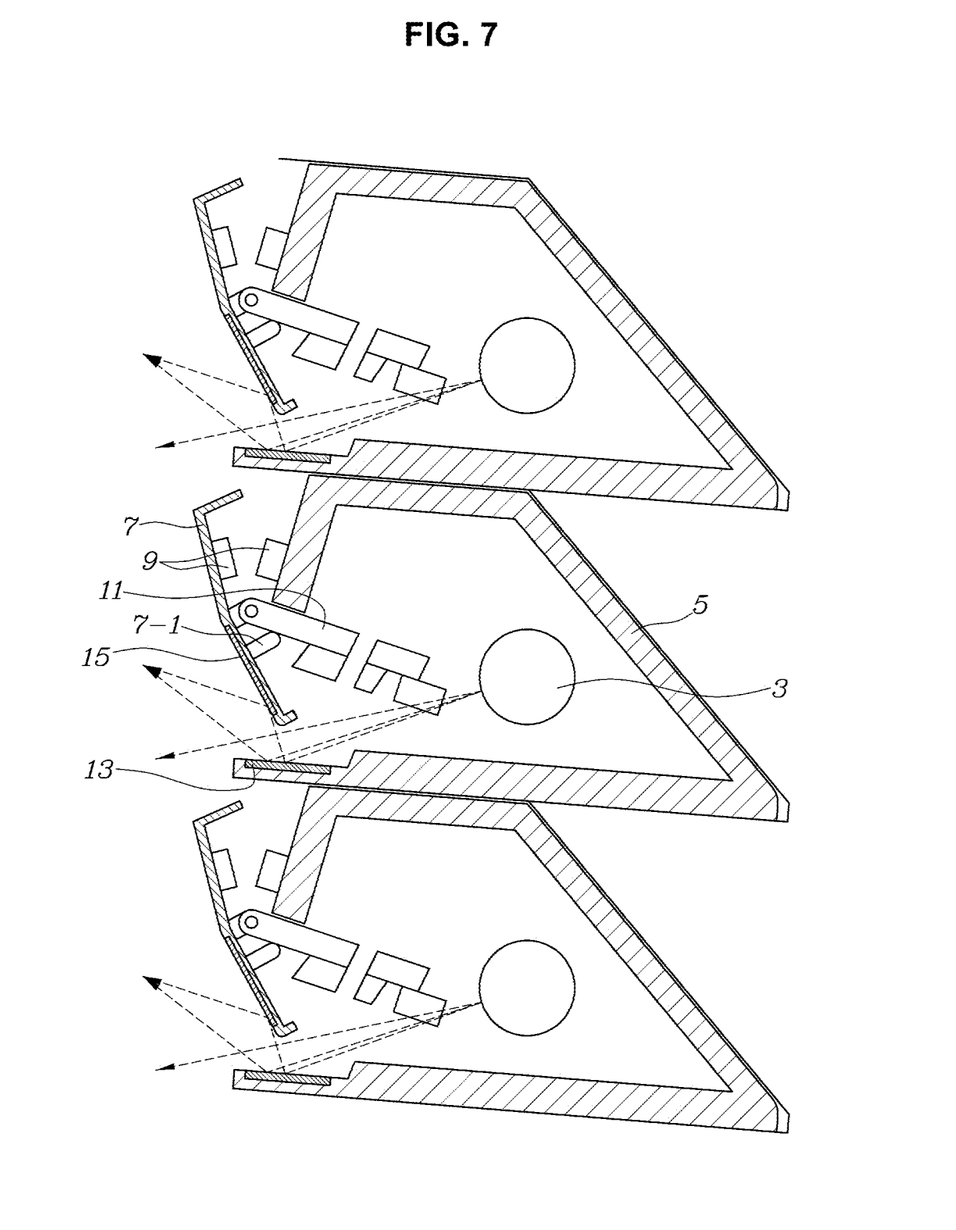
FIG. 7 is a view exemplarily illustrating a cross-sectional structure of each lightning cell having a configuration different from that of FIG. 2.

Meanwhile, FIG. 7 illustrates another exemplary embodiment of the cross-sectional structure of the lightning cell 1 forming the pattern skin lighting device. In the exemplary embodiment of the present invention, the cross-sectional structure of the lightning cell 1 is configured such that light generated from the light emitting element 3 of the lightning cell 1 is not only externally emitted after being reflected by the first mirror 13 and the second mirror 15, but also is externally emitted directly from the light emitting element 3.

That is, in accordance with various aspects of the present invention, the lightning cell 1 may be configured to externally emit light generated from the light emitting element 3 in a direct or indirect manner or in simultaneous direct and indirect manners through appropriate adjustment of the position of the light emitting element 3 and the shapes and structures of the cell pocket 5 and the cell cover 7.

Meanwhile, the actuator 9 may be configured to include an electromagnet disposed to vary magnetic force acting between the cell cover 7 and the cell pocket 5.

Electromagnets may be provided at both the cell cover 7 and the cell pocket 5. In the instant case, it may be possible to adjust the pivotal angle of the cell cover 7 with respect to the cell pocket 5 by adjusting intensities and directions of magnetic force of the two electromagnets.

Alternatively, an electromagnet may be provided at one of the cell cover 7 and the cell pocket 5, and a permanent magnet, which can react to magnetic force of the electromagnet, may be provided at the other of the cell cover 7 and the cell pocket 5. In the instant case, it may be possible to adjust the pivotal angle of the cell cover 7 through adjustment of the electromagnet.

Furthermore, the actuator 9 may be configured using various devices configured for generating linear displacement or pivotal displacement to adjust the pivotal angle of the cell cover 7 with respect to the cell pocket 5.

In an exemplary embodiment of the present invention, a controller is connected to the actuator 9 to control the operation of the actuator.

In addition, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

As apparent from the above description, the pattern skin lighting device 100 according to an exemplary embodiment of the present invention may achieve presentation of various lighting images varying in real time at the outside of a vehicle body by installing, at the outside of the vehicle body, the lightning cells 1 configured as described above such that the lightning cells 1 are disposed on a plane while forming a predetermined pattern as described above, and controlling the lightning cells in an individual manner.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A lightning cell for a pattern skin lighting device of a vehicle, the lightning cell comprising:
   a light emitting element;
   a cell pocket, inside which the light emitting element is mounted;
   a cell cover configured to be pivotable with respect to the cell pocket while surrounding the light emitting element; and
   an actuator engaged to an end of the cell cover and configured to selectively pivot the cell cover with respect to the cell pocket,
   wherein the cell cover is configured to be pivotable with respect to the cell pocket within a predetermined limited range,
   wherein a cell link is connected to an interior of the cell cover such that the cell cover is pivotable relative to the cell link,
   wherein the cell link is slidably mounted in the cell pocket to selectively slide in a direction toward the cell cover within a predetermined range, and
   wherein an angle limiting protrusion is formed to protrude from an interior of the cell cover toward the cell link and selectively engaged to the cell link to limit a rotation of the cell cover within the predetermined limited range.

2. The lightning cell according to claim 1, wherein the cell cover is disposed to allow light from the light emitting element to pass through a gap formed between an end portion of the cell cover and an end portion of the cell pocket.

3. The lightning cell according to claim 1, wherein the actuator includes an electromagnet mounted between the cell cover and the cell pocket to vary magnetic force acting between the cell cover and the cell pocket.

4. A pattern skin lighting device of a vehicle, the pattern skin lighting device comprising:

a plurality of lightning cells formed of the lighting cell according to claim 1, wherein the plurality of lightning cells is mounted on a plane while forming a predetermined pattern.

5. The lightning cell according to claim 2, wherein a first mirror is mounted at the cell pocket to reflect light advancing to the gap between the cell cover and the cell pocket from the light emitting element, facilitating the reflected light to be emitted to an outside of the lightning cell through the gap.

6. The lightning cell according to claim 5, wherein a second mirror is mounted at the cell cover to again reflect the light reflected by the first mirror, facilitating the re-reflected light to be emitted to an outside of the lightning cell.

7. The lightning cell according to claim 6, wherein an external surface of the cell cover has a shape in which at least two planes meet to form a predetermined angle.

8. The lightning cell according to claim 7,
wherein the external surface of the cell cover has a shape in which two planes among the at least two planes meet at a position adjacent to a pivot of the cell cover to form a predetermined angle; and
wherein the second mirror is mounted at a surface of a plane adjacent to the gap between the second mirror and the cell pocket, among the two planes outside the cell cover.

\* \* \* \* \*